United States Patent
Koseoglu et al.

(10) Patent No.: US 8,658,027 B2
(45) Date of Patent: Feb. 25, 2014

(54) INTEGRATED HYDROTREATING AND OXIDATIVE DESULFURIZATION PROCESS

(75) Inventors: Omer Refa Koseoglu, Dhahran (SA); Abdennour Bourane, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 925 days.

(21) Appl. No.: 12/748,888

(22) Filed: Mar. 29, 2010

(65) Prior Publication Data

US 2011/0233110 A1 Sep. 29, 2011

(51) Int. Cl.
*C10G 69/02* (2006.01)

(52) U.S. Cl.
USPC ........ 208/212; 208/208 R; 208/209; 208/213; 208/218; 208/240

(58) Field of Classification Search
USPC ........ 208/80, 208 R, 209, 212, 213, 218, 240
See application file for complete search history.

(56) References Cited

U.S. PATENT DOCUMENTS

| | | | |
|---|---|---|---|
| 2,749,284 A | 6/1956 | Noble | |
| 3,341,448 A | 9/1967 | Ford et al. | |
| 3,767,563 A | 10/1973 | Woodle | |
| 3,847,800 A | 11/1974 | Guth et al. | |
| 4,359,450 A | 11/1982 | Blytas et al. | |
| 4,409,199 A | 10/1983 | Blytas | |
| 4,494,961 A | 1/1985 | Venkat et al. | |
| 4,557,821 A | 12/1985 | Lopez et al. | |
| 4,830,733 A | 5/1989 | Nagji et al. | |
| 5,730,860 A | 3/1998 | Irvine | |
| 5,753,102 A | 5/1998 | Funakoshi et al. | |
| 5,824,207 A | 10/1998 | Lyapin et al. | |
| 5,910,440 A | 6/1999 | Grossman et al. | |
| 6,087,544 A | 7/2000 | Wittenbrink et al. | |
| 6,160,193 A | 12/2000 | Gore | |
| 6,171,478 B1 | 1/2001 | Cabrera et al. | |
| 6,277,271 B1 | 8/2001 | Kocal | |
| 6,368,495 B1 | 4/2002 | Kocal et al. | |
| 6,447,671 B1 | 9/2002 | Morel et al. | |
| 2002/0029997 A1 | 3/2002 | Rappas et al. | |

(Continued)

FOREIGN PATENT DOCUMENTS

WO  9856875 A1  12/1998
WO  0218518 A1  3/2002

(Continued)

OTHER PUBLICATIONS

Ruixiang Hua et al., "Determination of sulfur-containing compounds in diesel oils by comprehensive two-dimensional gas chromatography with a sulfur chemiluminescence detector." Journal of Chromatography, vol. 1019, Issues 1-2, Nov. 2003, 101-109.

(Continued)

*Primary Examiner* — Renee E Robinson
(74) *Attorney, Agent, or Firm* — Abelman, Frayne & Schwab

(57) ABSTRACT

A system and process for desulfurizing a hydrocarbon feed stream containing organosulfur compounds is provided. In general, the system includes a conventional hydrotreating unit through the high pressure cold or hot separator. Aqueous oxidant and an oxidative catalyst are mixed with the hydrotreated hydrocarbon effluent from the high pressure cold or hot separator, and oxidative desulfurization reactions occur in the low pressure separation zone, thereby minimizing or eliminating the requirement of additional oxidative desulfurization reactors.

8 Claims, 9 Drawing Sheets

(56) References Cited

U.S. PATENT DOCUMENTS

| | | |
|---|---|---|
| 2002/0035306 A1 | 3/2002 | Gore et al. |
| 2002/0148754 A1* | 10/2002 | Gong et al. ............... 208/3 |
| 2003/0019794 A1 | 1/2003 | Schmidt et al. |
| 2003/0085156 A1 | 5/2003 | Schoonover |
| 2003/0094400 A1 | 5/2003 | Levy et al. |
| 2004/0108252 A1 | 6/2004 | De Souza |
| 2004/0118750 A1 | 6/2004 | Gong et al. |
| 2004/0154959 A1 | 8/2004 | Schoebrechts et al. |
| 2004/0222134 A1 | 11/2004 | de Souza |
| 2005/0040078 A1 | 2/2005 | Ziinnen et al. |
| 2005/0109678 A1 | 5/2005 | Ketley et al. |
| 2005/0150819 A1 | 7/2005 | Wachs |
| 2005/0218038 A1 | 10/2005 | Nero et al. |
| 2006/0021913 A1 | 2/2006 | Ketley et al. |
| 2006/0054535 A1 | 3/2006 | Chen et al. |
| 2006/0081501 A1 | 4/2006 | Kozyuk |
| 2006/0131214 A1 | 6/2006 | De Souza et al. |
| 2006/0180501 A1 | 8/2006 | Da Silva et al. |
| 2007/0051667 A1 | 3/2007 | Martinie et al. |
| 2007/0102323 A1 | 5/2007 | Lee et al. |
| 2007/0151901 A1 | 7/2007 | Sain et al. |
| 2007/0175798 A1 | 8/2007 | Fokema et al. |
| 2007/0227947 A1 | 10/2007 | Reynolds |
| 2007/0227951 A1 | 10/2007 | Thirugnanasampanthar et al. |
| 2008/0308463 A1* | 12/2008 | Keckler et al. ............ 208/249 |

FOREIGN PATENT DOCUMENTS

| | | |
|---|---|---|
| WO | 03014266 A1 | 2/2003 |
| WO | 2005012458 A1 | 2/2005 |
| WO | 2006071793 A1 | 7/2006 |

OTHER PUBLICATIONS

Petr Steiner et al., "Catalytic hydrodesulfurization of a light gas oil over a NiMo catalyst: kinetics of selected sulfur components." Fuel Processing Technology, vol. 79, Issue 1, Aug. 2, 2002, 1-12.

PCT/US2011/030158, International Search Report and Written Opinion dated May 26, 2011, 7 pages.

* cited by examiner

INTEGRATED HYDROTREATING AND OXIDATIVE DESULFURIZATION PROCESS

RELATED APPLICATIONS

Not applicable.

BACKGROUND OF THE INVENTION

1. Field of the Invention

This invention relates to desulfurization of hydrocarbon streams; and in particular to a system and process for integrated hydrotreating and oxidative desulfurization of hydrocarbon streams to produce reduced sulfur-content hydrocarbon fuels.

2. Description of Related Art

The discharge into the atmosphere of sulfur compounds during processing and end-use of the petroleum products derived from sulfur-containing sour crude oil pose health and environmental problems. The stringent reduced-sulfur specifications applicable to transportation and other fuel products have impacted the refining industry, and it is necessary for refiners to make capital investments to greatly reduce the sulfur content in gas oils to 10 parts per million by weight (ppmw), or less. In industrialized nations such as the United States, Japan and the countries of the European Union, refineries for transportation fuel have already been required to produce environmentally clean transportation fuels. For instance, in 2007 the United States Environmental Protection Agency required the sulfur content of highway diesel fuel to be reduced 97%, from 500 ppmw (low sulfur diesel) to 15 ppmw (ultra-low sulfur diesel). The European Union has enacted even more stringent standards, requiring diesel and gasoline fuels sold in 2009 to contain less than 10 ppmw of sulfur. Other countries are following in the direction of the United States and the European Union and are moving forward with regulations that will require refineries to produce transportation fuels with an ultra-low sulfur level.

To keep pace with recent trends toward production of ultra-low sulfur fuels, refiners must choose among the processes or crude oils that provide flexibility to ensure that future specifications are met with minimum additional capital investment, in many instances by utilizing existing equipment. Conventional technologies such as hydrocracking and two-stage hydrotreating offer solutions to refiners for the production of clean transportation fuels. These technologies are available and can be applied as new grassroots production facilities are constructed. However, many existing hydroprocessing facilities, such as those using relatively low pressure hydrotreaters, were constructed before these more stringent sulfur reduction requirements were enacted and represent a substantial prior investment. It is very difficult to upgrade existing hydrotreating reactors in these facilities because of the comparably more severe operational requirements (i.e., higher temperature and pressure conditions) to obtain clean fuel production. Available retrofitting options for refiners include elevation of the hydrogen partial pressure by increasing the recycle gas quality, utilization of more active catalyst compositions, installation of improved reactor components to enhance liquid-solid contact, the increase of reactor volume, and the increase of the feedstock quality.

There are many hydrotreating units installed worldwide producing transportation fuels containing 500-3000 ppmw sulfur. These units were designed for, and are being operated at, relatively milder conditions, i.e., low hydrogen partial pressures of 30 kilograms per square centimeter for straight run gas oils boiling in the range of 180 C.°-370° C.

However, with the increasing prevalence of more stringent environmental sulfur specifications in transportation fuels mentioned above, the maximum allowable sulfur levels are being reduced to no greater than 15 ppmw, and in some cases no greater than 10 ppmw. This ultra-low level of sulfur in the end product typically requires either construction of new high pressure hydrotreating units, or a substantial retrofitting of existing facilities, e.g., by integrating new reactors, incorporating gas purification systems, reengineering the internal configuration and components of reactors, and/or deployment of more active catalyst compositions. Each of these options represents a substantial capital investment Hydrotreating/hydrocracking technology includes well-known processes and generally incorporates two main sections: reaction and separation. The configuration and types of separation sections typically depends upon the reactor effluent. Reactor effluents can be either sent to a hot separator (referred to in the industry as a "hot scheme") or a cold separator (referred to in the industry as a "cold scheme").

In a typical hydrotreating unit 10 schematically depicted in FIG. 1, feedstock 12 is introduced into a feedstock surge drum 14. A make-up hydrogen stream 16, after compression in a compressor 18, is mixed with feedstock from the surge drum 14, and the mixture is heated in a heat exchanger 20 using reactor effluents 30 as a source of thermal exchange. The partially heated feedstock-hydrogen mixture 22 is further heated to a suitable reaction temperature in a furnace 24, and the fully heated feedstock-hydrogen mixture 26 introduced to a catalytic reactor 28. In the catalytic reactor 28, the hydrocarbon feedstock is refined by removal of impurities such as sulfur and nitrogen using a hydrotreating catalyst as is conventionally known. Reactor effluents 30 are then cooled in the exchanger 20 and sent to a high pressure cold or hot separator 32.

Separator tops 34, including gaseous components $H_2S$, $NH_3$, and $C_1$-$C_4$, and some heavier components such as $C_5$-$C_6$, are separated in the high pressure separator 32 and sent for further cleaning in an amine unit 36. A hydrogen rich gas stream 38, essentially free of hydrogen sulfide, is passed to a recycling compressor 40 to be used as a recycle gas 42 in the catalytic reactor 28. The high pressure separator bottoms effluent stream 44, in a substantially liquid phase, is washed with process water introduced via a line 45 to prevent salt formation with any remaining $H_2S$ and $NH_3$. Water is injected into the reactor effluents after the high pressure separator to prevent fouling by salt formation as a result of the byproducts according to the reaction $NH_3+H_2S \rightarrow NH_4SH$. Ammonium sulfide, soluble in water, can be removed from the system with the wastewater.

The mixture of bottoms effluent 44 and process water is typically cooled, for example using an air cooler 46, such as a fin fan cooler, and a water cooler 48, to a temperature of about 35° C. to about 60° C., preferably about 40° C. to about 50° C. The cooled bottoms from the high pressure separator are then introduced to a low pressure cold separator 50. Remaining gases, including $H_2S$ and $NH_3$ and any light hydrocarbons, which can include $C_1$-$C_4$ hydrocarbons, are purged via line 54 from the low pressure cold separator 50 and sent for further processing, such as flare processing, fuel gas processing, or hydrogen recovery within the refinery complex containing the hydrotreating unit 10 (not shown). Water 52 is separated in the low pressure cold separator and the hydrocarbon fraction 56 is passed to the fractionator 58.

However, as mentioned above, most existing hydrotreating processes cannot remove all of the sulfur-containing compounds typically present in hydrocarbonaceous fuels. These sulfur-containing compounds include aliphatic molecules such as sulfides, disulfides and mercaptans as well as aromatic molecules such as thiophene, benzothiophene, dibenzothiophene (DBT) and alkyl derivatives such as 4,6-dimethyl-dibenzothiophene (DMDBT). The aromatic sulfur containing molecules have a higher boiling point than the aliphatic molecules, and are consequently more abundant in higher boiling fractions.

In addition, certain fractions of gas oils possess different properties. The following table illustrates the properties of light and heavy gas oils derived from Arabian Light crude oil:

TABLE 1

| Feedstock Name | Light | Heavy |
|---|---|---|
| Blending Ratio | | |
| API Gravity | 37.5° | 30.5° |
| Carbon | 85.99 W % | 85.89 W % |
| Hydrogen | 13.07 W % | 12.62 W % |
| Sulfur | 0.95 W % | 1.65 W % |
| Nitrogen | 42 ppmw | 225 ppmw |
| ASTM D86 Distillation | | |
| IBP/5 V % | 189/228° C. | 147/244° C. |
| 10/30 V % | 232/258° C. | 276/321° C. |
| 50/70 V % | 276/296° C. | 349/373° C. |
| 85/90 V % | 319/330° C. | 392/398° C. |
| 95 V % | 347° C. | |
| Sulfur Speciation (ppmw) | | |
| Sulfur Compounds Boiling below 310° C. | 4591 | 3923 |
| Dibenzothiophenes | 1041 | 2256 |
| $C_1$-Dibenzothiophenes | 1441 | 2239 |
| $C_2$-Dibenzothiophenes | 1325 | 2712 |
| $C_3$-Dibenzothiophenes | 1104 | 5370 |

As set forth above in Table 1, the light and heavy gas oil fractions have ASTM D86 85/90 V % point of 319° C. and 392° C., respectively. Further, the light gas oil fraction contains less sulfur (0.95 W % as compared to 1.65 W %) and nitrogen (42 ppmw as compared to 225 ppmw) than the heavy gas oil fraction.

Advanced analytical techniques such as multi-dimensional gas chromatography with a sulfur chemiluminescence detector as described by Hua, et al. (Hua R., et al., "Determination of sulfur-containing compounds in diesel oils by comprehensive two-dimensional gas chromatography with a sulfur chemiluminescence detector," *Journal of Chromatography A*, Volume 1019, Issues 1-2, Nov. 26, 2003, Pages 101-109) have shown that the middle distillate cut boiling in the range of 170-400° C. contains sulfur species including thiols, sulfides, disulfides, thiophenes, benzothiophenes, DBTs, and benzonaphthothiophenes, with and without alkyl substituents.

The sulfur speciation and content of light and heavy gas oils are conventionally analyzed by two methods. In a first method, sulfur species are categorized based on structural groups. The structural groups include one group having sulfur compounds boiling at less than 310° C., including DBTs and its alkylated isomers, and another group including 1, 2 and 3 methyl substituted DBTs, denoted as $C_1$, $C_2$ and $C_3$, respectively. Based on this method, the heavy gas oil fraction contains more alkylated dibenzothiophene molecules than the light gas oils.

In a second method of analyzing sulfur speciation and content of light and heavy gas oils, and referring to FIG. 2, the cumulative sulfur concentrations are plotted against the boiling points of the sulfur compounds to observe concentration variations and trends. Note that the boiling points depicted are those of detected sulfur compounds, rather than the boiling point of the total hydrocarbons mixture. The boiling point of several of the refractory sulfur compounds consisting of DBTs, 4-methyl-dibenzo-thiophenes (MDBT) and 4,6-DM-DBT are also shown in FIG. 2 for convenience. The cumulative sulfur speciation curves show that the heavy gas oil fraction contains a higher proportion of heavier sulfur compounds and a lower proportion of lighter sulfur compounds as compared to the light gas oil fraction. For example, it is found that 5370 ppmw of $C_3$-DBT, and bulkier molecules such as benzo-naphtho-thiophenes, are present in the heavy gas oil fraction, compared to 1104 ppmw in the light gas oil fraction. In contrast, the light gas oil fraction contains a higher content of light sulfur compounds compared to heavy gas oil (4591 vs. 3923 ppmw). Light sulfur compounds are structurally less bulky than DBTs and boil at less than 310° C. Further, twice as much $C_1$ and $C_2$ alkyl substituted DBTs exist in the heavy gas oil fraction as compared to the light gas oil fraction.

Aliphatic sulfur compounds are more easily desulfurized, i.e., commonly referred to as "labile" using conventional hydrodesulfurization methods. However, certain highly branched aliphatic molecules can sterically hinder the sulfur atom removal and are moderately more difficult to desulfurize, i.e., commonly referred to as "refractory" using conventional hydrodesulfurization methods.

Among the sulfur-containing aromatic compounds, thiophenes and benzothiophenes are relatively easy to hydrodesulfurize. The addition of alkyl groups to the ring compounds slightly increases difficulty of hydrodesulfurization. DBTs resulting from addition of another ring to the benzothiophene family are even more difficult to desulfurize, and the difficulty varies greatly according to their alkyl substitution, with di-beta substitution being the most difficult to desulfurize, thus justifying their refractory appellation. These beta substitutes hinder the exposure of the heteroatom from the active site on the catalyst.

The economical removal of refractory sulfur compounds is therefore exceedingly difficult to achieve, and accordingly removal of sulfur compounds in hydrocarbonaceous fuels to ultra-low sulfur levels is very costly utilizing current hydrotreating techniques. When the sulfur specifications at previous levels permitted up to 500 ppmw, there was little need or incentive to desulfurize beyond the capabilities of conventional hydrodesulfurization, and hence the refractory sulfur compounds were not targeted. However, in order to meet the more stringent sulfur specifications, these refractory sulfur compounds must be substantially removed from hydrocarbonaceous fuels streams.

Relative hydrodesulfurization reactivities and activation of sulfur compounds are shown in the below table:

TABLE 2

| Name | DBT | 4-MDBT | 4,6-DMDBT |
|---|---|---|---|
| Temperature | 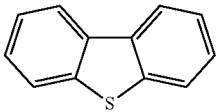 | 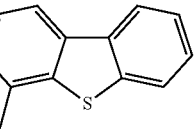 | 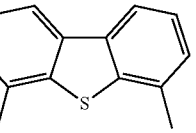 |
| Reactivity $k_{@250}$, $s^{-1}$ | 57.7 | 10.4 | 1.0 |

TABLE 2-continued

| Name | DBT | 4-MDBT | 4,6-DMDBT |
|---|---|---|---|
| Reactivity $k_{@300}$, $s^{-1}$ | 7.3 | 2.5 | 1.0 |
| Activation Energy $E_a$, Kcal/mol | 28.7 | 36.1 | 53.0 |

Relative reactivities of sulfur compounds based on their first order reaction rates at 250° C. and 300° C., and 40.7 Kg/cm² hydrogen partial pressure over Ni—Mo/Alumina catalyst are given (Steiner, P. et al., "Catalytic hydrodesulfurization of a light gas oil over a NiMo catalyst: kinetics of selected sulfur components," *Fuel Processing Technology*, Vol. 79, Issue 1, Aug. 20, 2002, pages 1-12) in Table 2. DBT is 57 times more reactive than the refractory 4,6-DMDBT at 250° C. The relative reactivity decreases with increasing operating severity. With a 50° C. temperature increase, the relative reactivity of di-benzothiophene compared to 4,6-DMDBT decreases to 7.3 from 57.7.

Most known advances in the industry for minimizing these undesirable effects include development of more robust hydrotreating catalysts and advanced hydrodesulfurization reactor designs. Alternative processes have also been developed to meet the requirements of decreased sulfur levels in fuels and other petrochemical products.

The development of non-catalytic processes to carry out the final desulfurization of petroleum distillate feedstocks has been widely studied, and certain conventional approaches are based on oxidation of sulfur-containing compounds described in U.S. Pat. Nos. 5,910,440, 5,824,207, 5,753,102, 3,341,448 and 2,749,284.

Certain existing desulfurization processes incorporate both hydrodesulfurization and oxidative desulfurization. For instance, Cabrera et al. U.S. Pat. No. 6,171,478, Zinnen et al. US20050040078A1, and Kocal U.S. Pat. No. 6,277,271 describe integrated processes in which the hydrocarbon feedstock is first contacted with a hydrodesulfurization catalyst in a hydrodesulfurization reaction zone to reduce the sulfur content to the low sulfur level. The resulting hydrocarbon stream is then passed to a distinct oxidation zone containing an oxidizing agent where the residual sulfur is converted into oxidized sulfur compounds under mild conditions. After decomposing the residual oxidizing agent, the oxidized sulfur compounds are solvent extracted, resulting in an oxidized sulfur compound stream and a reduced sulfur hydrocarbon oil stream.

However, all of the aforementioned processes known in the art require construction and installation of a grass roots oxidation vessel to carry out the oxidative desulfurization.

Therefore, a need exists for an improved desulfurizing process and apparatus that minimizes the requirement of newly constructed and installed reaction vessels.

Therefore, it is an object of the present invention to modify existing hydrotreating units without the need to construct grass roots units and newly constructed and installed reaction vessels for oxidative desulfurization, thereby requiring very high capital investments.

It is another object of the present invention to provide such a modification that incorporates oxidative desulfurization step within a hydrodesulfurization unit thereby advantageously utilizing existing infrastructure in an efficient and effective manner.

SUMMARY OF THE INVENTION

The above objects and further advantages are provided by the system and process for desulfurizing a hydrocarbon feed stream containing organosulfur compounds. In general, processing steps including, and upstream of, the high pressure cold or hot separator are essentially the same as a conventional hydrotreating unit. Aqueous oxidant and an oxidative catalyst are mixed with the hydrotreated hydrocarbon effluent from the high pressure cold or hot separator, and oxidative desulfurization reactions occur in the low pressure separation zone.

In particular, in one aspect of the invention, the hydrocarbon feed stream is subjected to a hydrotreating reaction, in which the hydrocarbon feed stream is contacted with hydrogen to convert a portion of the organosulfur compounds into a hydrotreated effluent containing hydrogen sulfide and a mixture of hydrocarbons. The hydrotreated reaction effluent, having a reduced organosulfur compound content as compared to the hydrocarbon feed stream, is mixed with an aqueous oxidant and an oxidation catalyst. The combined stream is introduced into a separator, in which a portion of the remaining organosulfur compounds from the hydrotreated reaction effluent are oxidized. The contents of the separator are generally distributed into a) a gas overhead stream containing a portion of the hydrogen sulfide from the hydrotreated reaction effluent stream, hydrogen and light hydrocarbons, and b) a liquid hydrocarbon stream containing hydrocarbons and oxidation reaction products including sulfoxides and sulfones. The liquid stream is further separated in an extraction vessel into an oxidation reaction product stream and a reduced organosulfur-content hydrocarbon product stream.

BRIEF DESCRIPTION OF THE DRAWINGS

The invention will be described in further detail below and with reference to the attached drawings in which the same or similar elements are referred to by the same number, and where.

DETAILED DESCRIPTION OF THE INVENTION

Figure 1:
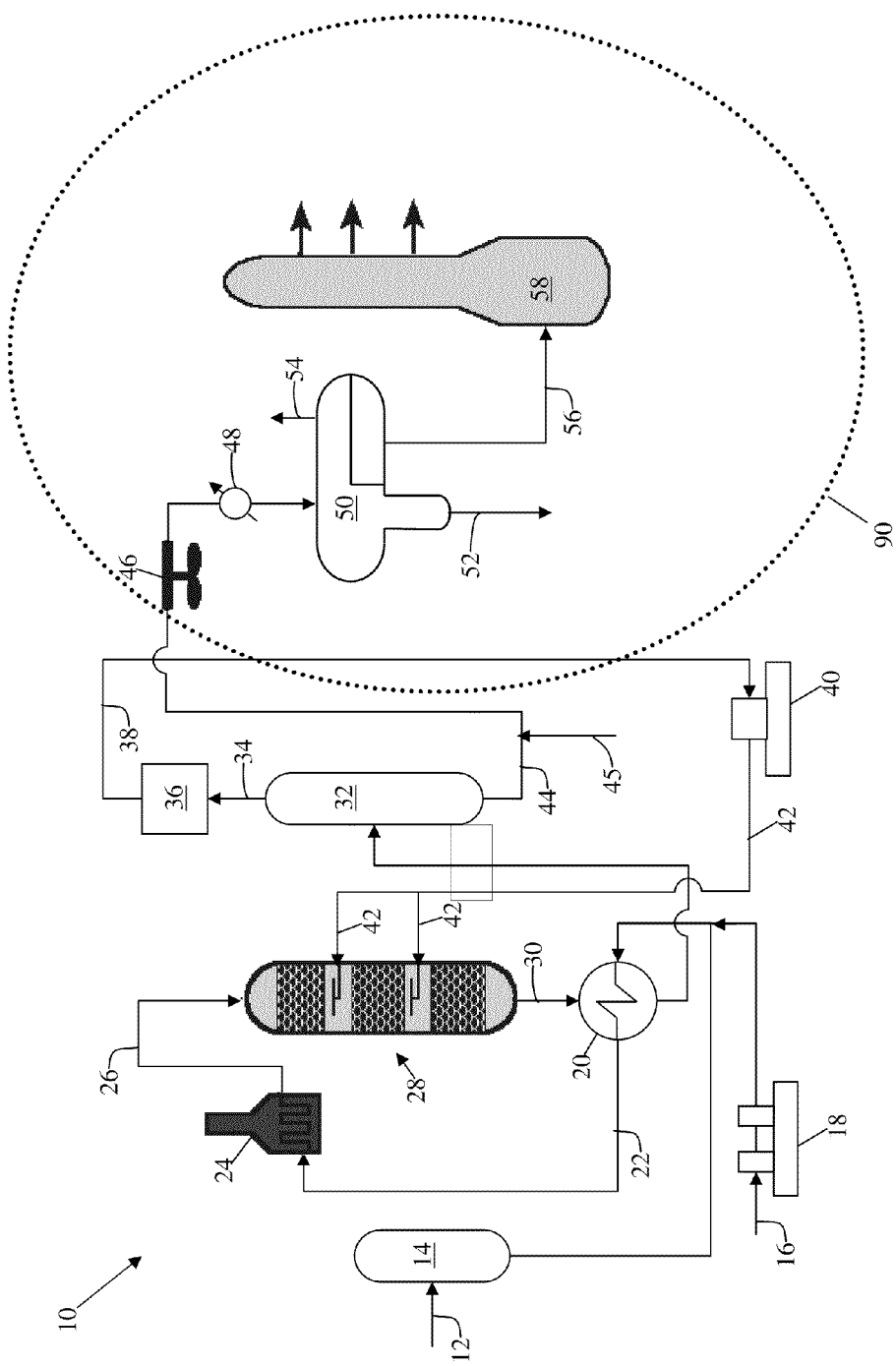
FIG. 1 is a schematic diagram of a prior art hydrotreating unit.
Figure 2:
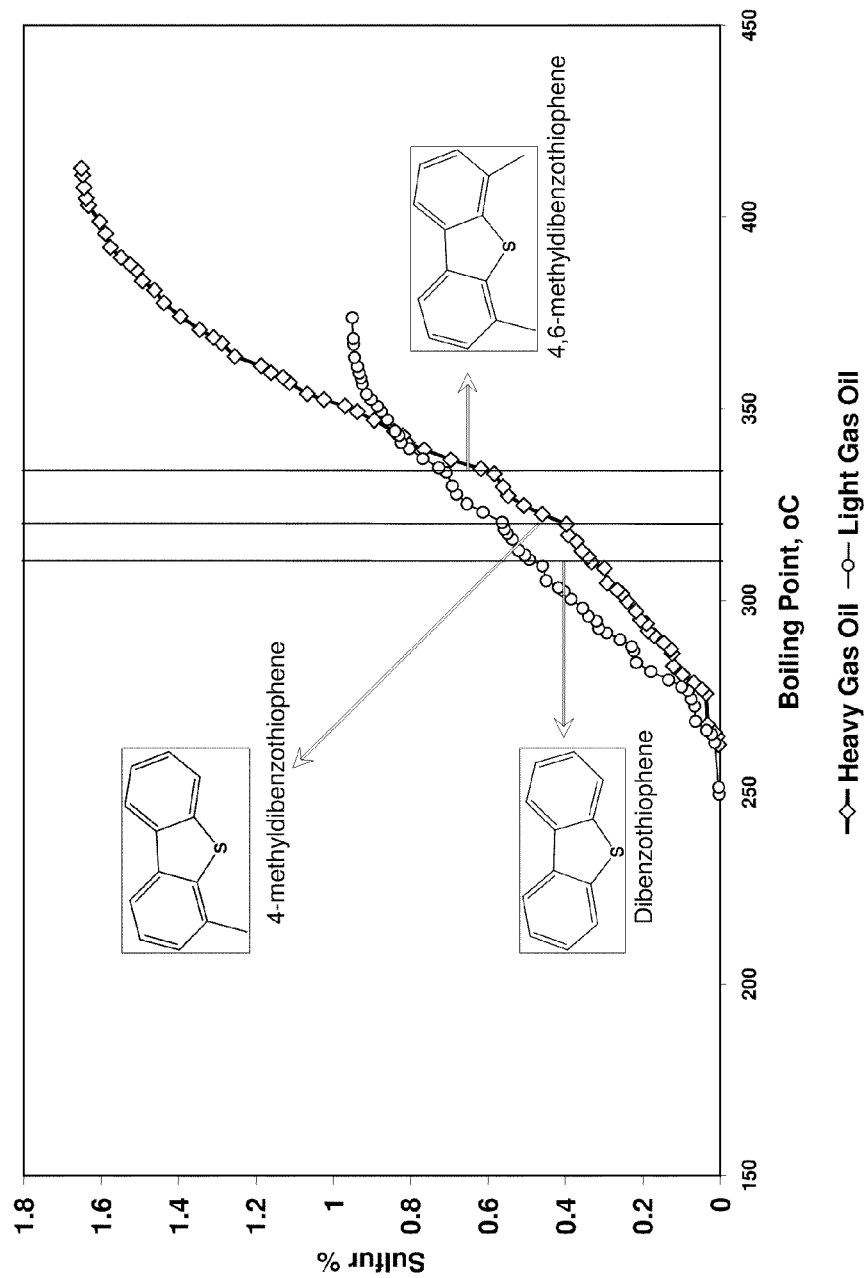
FIG. 2 is a graph showing cumulative sulfur concentrations plotted against boiling points of the sulfur compounds, identifying boiling points of three thiophenic compounds.

FIGS. 3-8 are process flow diagrams according to embodiments of the present invention incorporating oxidative desulfurization within a region 90 (as shown in FIG. 1) including low pressure low temperature separation zones of a hydrotreating unit 10. The processing steps upstream and including the high pressure cold or hot separator 32 are essentially the same as described above with respect to FIG. 1 and as known to those of ordinary skill in the art, and are not replicated in FIGS. 3-8 for clarity of description. Advantageously, an aqueous oxidant and an oxidative catalyst are mixed with the hydrotreated hydrocarbon effluent from the high pressure separator 32. Existing hydrotreating unit operation(s), in particular, one or more low pressure separation zones, serve as the locale for oxidative desulfurization.

Figure 3:
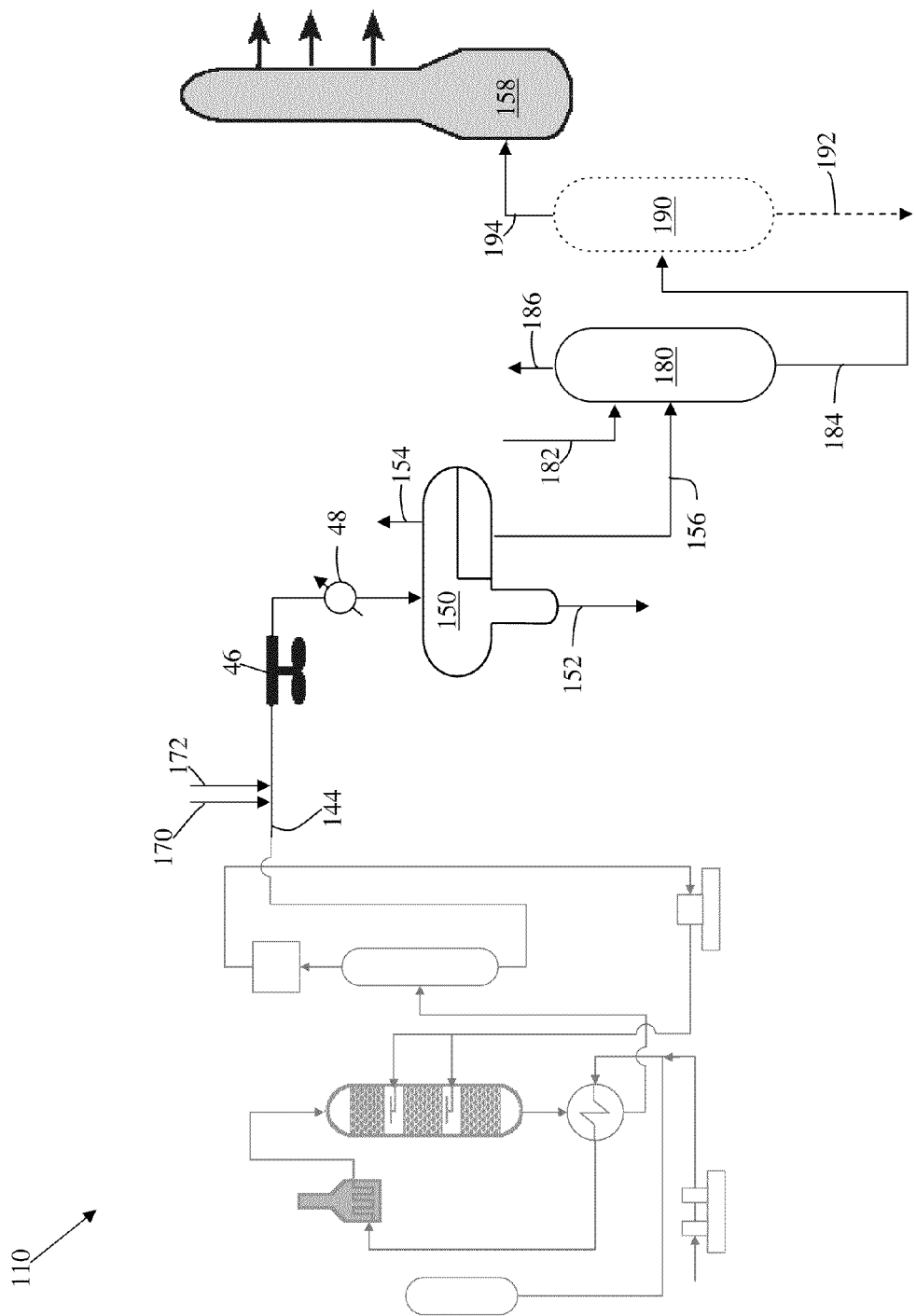
FIG. 3 is a process flow diagram of a hydrotreating unit according to one embodiment of the present invention integrating oxidative desulfurization in a low pressure separation zone.

FIG. 3 is a process flow diagram of a hydrotreating unit 110 including a low pressure low temperature separator 150 in which both oxidative desulfurization reactions and separation of gases and process water occur under low pressure conditions. Hydrotreating unit 110 also includes an extraction unit 180 and optionally an adsorption unit 190 upstream of a fractionating unit 158. Aqueous oxidant is added via an inlet 170 and oxidative catalyst is added via an inlet 172. Although two separate inlets 170, 172 are shown, one of ordinary skill in the art will appreciate that in certain embodiments oxidant and catalyst can be added through a common inlet, and can be introduced into a high pressure separator bottoms effluent stream 144 prior to further cooling or after cooling (as shown with respect to FIG. 4). The sequence of the incorporation of oxidant 170 and catalyst 172 can vary.

Oxidant in the amount of at least about 4:1 mole:mole ratio of oxidant to sulfur in the feed is added to the high pressure separator bottoms effluent stream 144. Catalyst in the amount of at least about 0.5 wt % based on the total hydrocarbon flow rate is added to the high pressure separator bottoms effluent stream 144. The combined stream of the aqueous oxidant, catalyst and high pressure separator bottoms is cooled, e.g., using the air cooler 46 and water cooler 48 if necessary, and introduced into the low pressure low temperature separator 150. In preferred embodiments of the present invention, the injection and/or transport within the pipe carrying the high pressure separator bottoms effluent stream 144 provides sufficient mixing between the oxidant and catalyst, and the hydrocarbon mixture.

In certain embodiments, the process water used for washing can be a separate water stream. In additional embodiments, process water is provided by the aqueous oxidant via 170. The aqueous oxidant can be mixed into the high pressure separator bottom stream 144 by suitable droplet injection, which facilitates solubilization of the hydrogen sulfide and ammonia gases in the water.

According to the present invention, the aqueous oxidant and catalyst remain in contact with the hydrocarbon effluent 144 for a period of time sufficient to allow the oxidative desulfurization reactions to occur, i.e., conversion of organosulfur compounds into their corresponding sulfoxides and/or sulfones. The contact time is generally about 5 minutes to about 60 minutes, preferably about 15 minutes to about 30 minutes.

The oxidation temperature, i.e., the temperature at which the reactants are maintained in the line between the high pressure separator and the low pressure low temperature separator 150, is about 20° C. to about 150° C., preferably about 45° C. to about 60° C. The pressure in the low pressure low temperature separator 150 is about 1 bar to about 15 bars, preferably about 2 bars to about 3 bars. The temperature variation between the high pressure separator effluent and the low pressure separator feed can be about 100° C. to about 150° C.

The catalyst, e.g., introduced via inlet 172, can be one or more oxides of having the general chemical formula $M_xO_y$, in which M is selected from the elements of groups IV-B, V-B or VI-B of the Periodic Table. The oxidants, e.g., introduced via inlet 170, can be one or more peroxides, hydroperoxides, organic peracids. Any suitable catalyst or oxidant can be used for oxidative desulfurization as is known to those of ordinary skill in the art.

Figure 4:
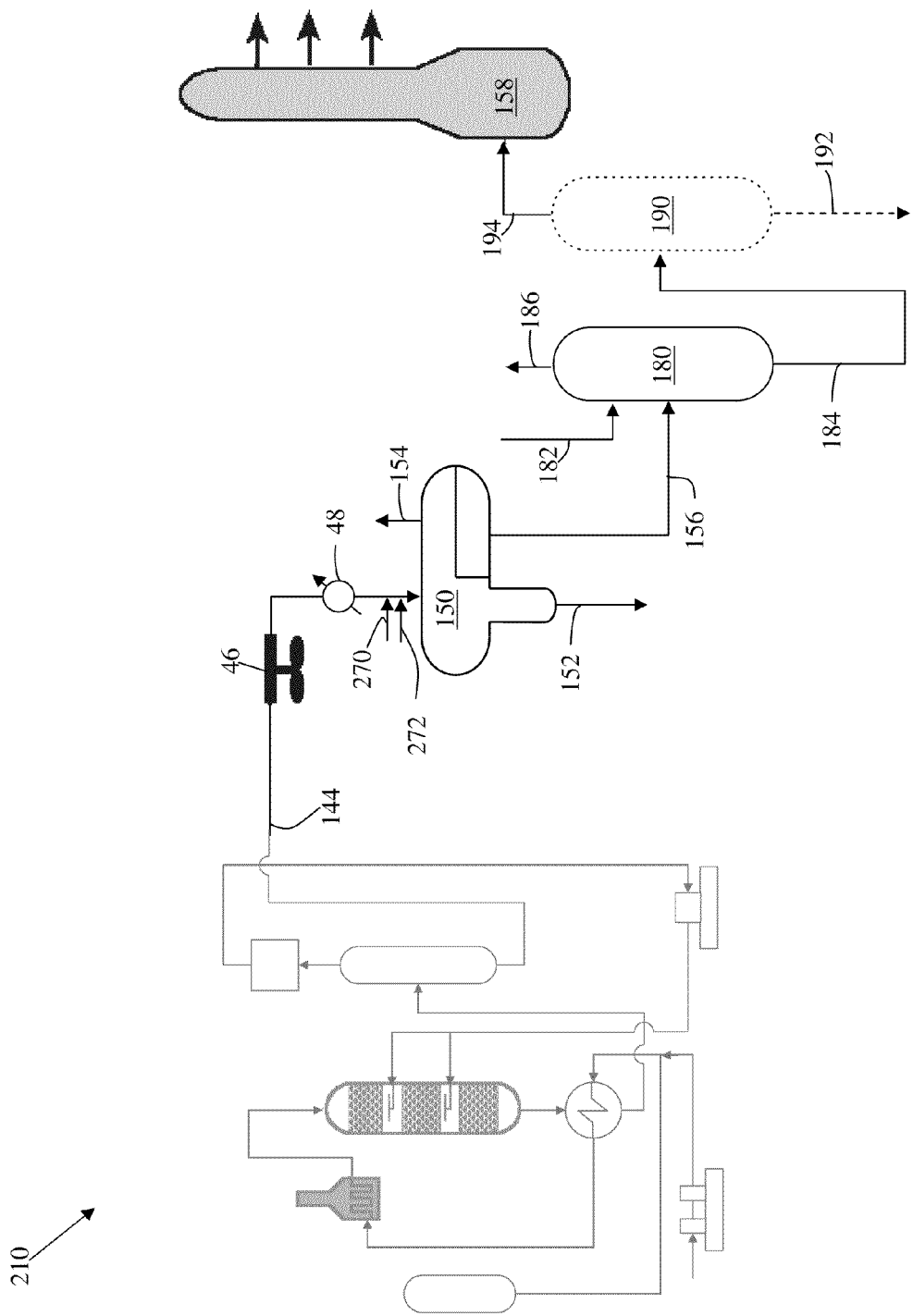
FIG. 4 is a process flow diagram of a hydrotreating unit according to a further embodiment of the present invention depicting an alternate location for introducing oxidant and oxidative catalyst.

In certain embodiments, the residence time in the pipe and in a single low pressure low temperature separator 150 is sufficient to convert the desired quantity of organosulfur compounds remaining after hydrodesulfurization into their corresponding sulfoxides and sulfones. Accordingly, system 110 requires very minimal modification to existing hydrotreating units to integrate oxidative desulfurization. Catalyst and aqueous oxidant can be introduced at or near the location where process wash water is introduced in a conventional hydrotreating unit. The present invention also contemplates introduction of aqueous oxidant and/or catalyst at other locations, including downstream of the air cooler 46 or the water cooler 48, as shown in FIG. 4.

In alternative embodiments, as shown with respect to FIGS. 5 through 8, a plurality of low pressure low temperature separators are provided as vessels for integrated separation and oxidative desulfurization reactions for conversion of organosulfur compounds into their corresponding sulfoxides and/or sulfones.

Water and dissolved ammonium salt, catalyst and unreacted oxidants are decanted via stream 152 from the low pressure cold separator 150. Catalysts can be recovered and recycled to inlet 172 (not shown). In addition, any sulfones and/or sulfoxides that are soluble in water, generally a minor portion of the total oxidation products, can also be decanted with the wastewater via stream 152. Separator tops, which include the same gases as in a conventional low pressure low temperature separator, and any oxidants that are converted to gaseous oxygen, are purged via overhead stream 154 from the low pressure cold separator 150.

A hydrocarbon stream 156 containing untreated hydrocarbons and oxidative desulfurization products sulfoxides and/or sulfones, is discharged from the low pressure cold separator 150 and introduced to the extraction unit 180. The reaction byproducts sulfoxides and/or sulfones are extracted from the hydrocarbon mixture with an extraction solvent 182. The extractor bottoms 184 are collected as a wide range hydrocarbon product, passed to the fractionator 158 for fractioning into final or intermediate product, or optionally introduced to an adsorption unit 190, shown in broken lines in FIGS. 3-8, to remove any remaining sulfones and/or sulfoxides. The extractor tops 186 include primarily sulfones and sulfoxides that can be passed to a hydrocarbon recovery section or disposed in a waste stream after solvent recovery (not shown). Accordingly, a hydrocarbon product having reduced organosulfur content is recovered from the extraction unit 180 (stream 184) or the adsorption unit 190 (stream 194).

Referring now to FIG. 4, an alternative embodiment of the present invention is shown with reference to a hydrotreating unit 210, in which aqueous oxidant 270 and oxidative catalyst 272 are mixed with the cooled hydrocarbons, i.e., after the hydrocarbon stream 144 has been cooled by the air cooler 46 and the water cooler 48. The mixture is introduced to the low pressure cold separator 150, and the product, gas and waste streams are removed in the same manner as described with reference to FIG. 3.

Figure 5:
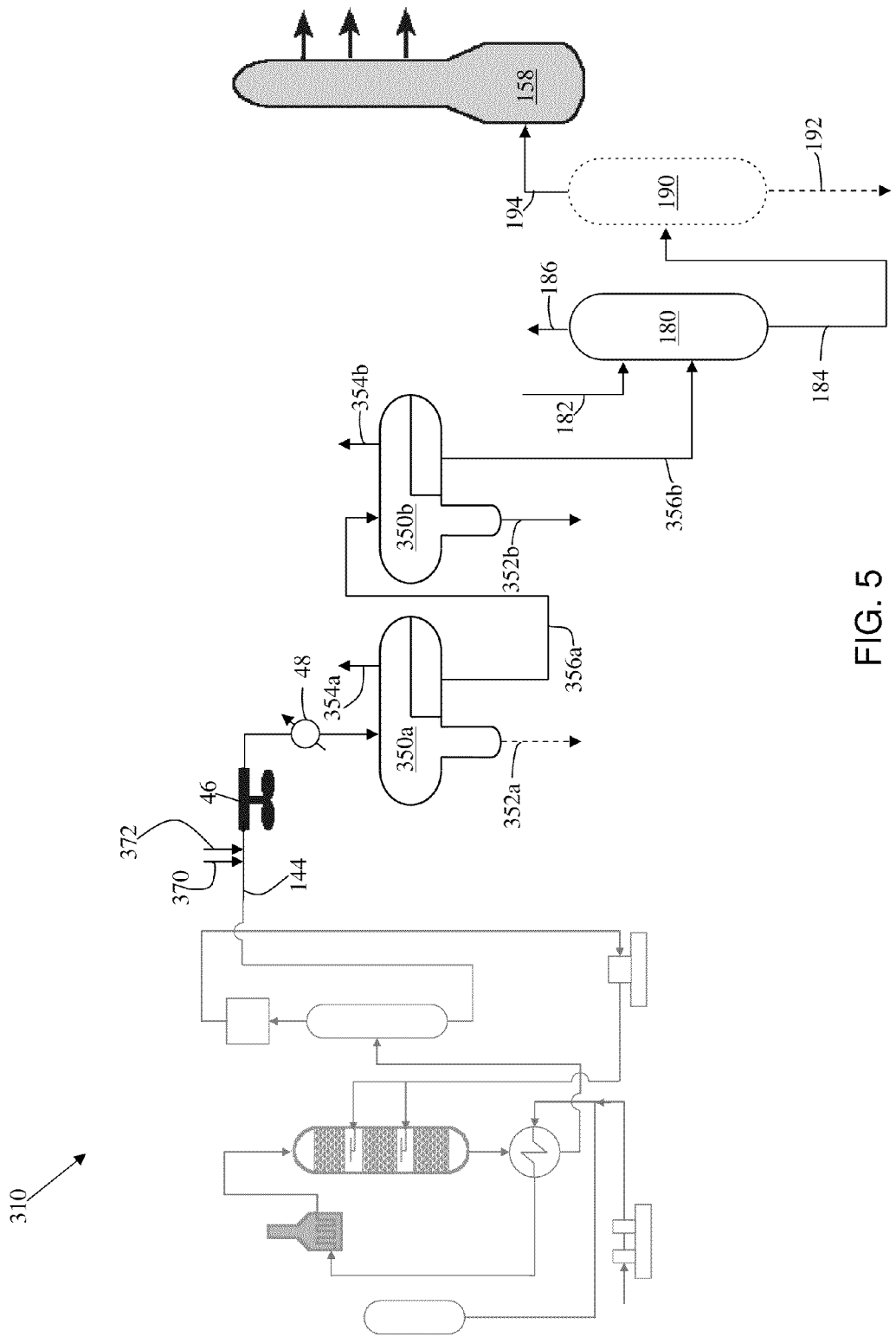
FIGS. 5 and 6 are process flow diagrams of a hydrotreating unit according to still further embodiments of the present invention integrating oxidative desulfurization in a low pressure separation zone including series separation vessels.
Figure 6:
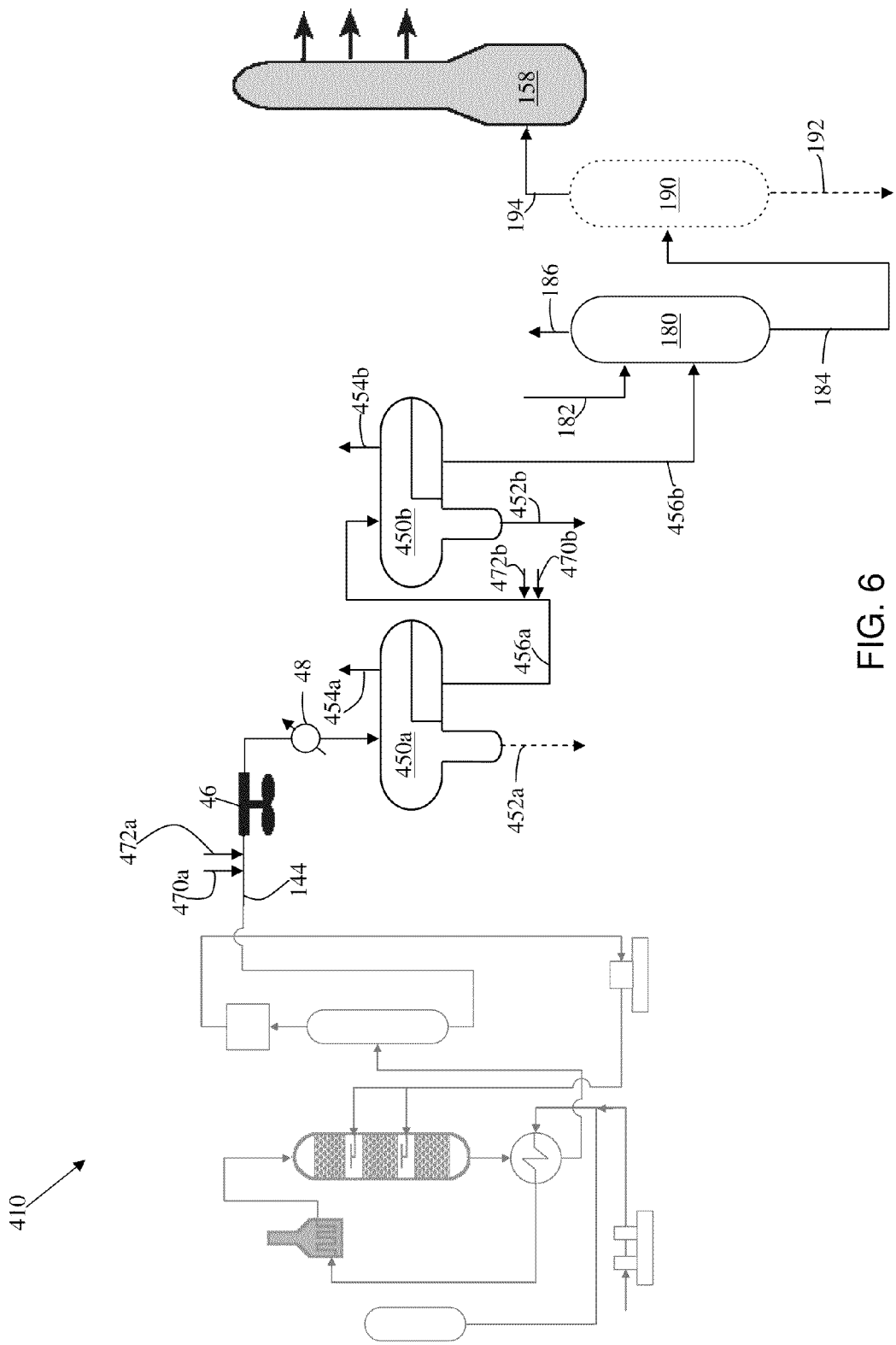
Figure 7:
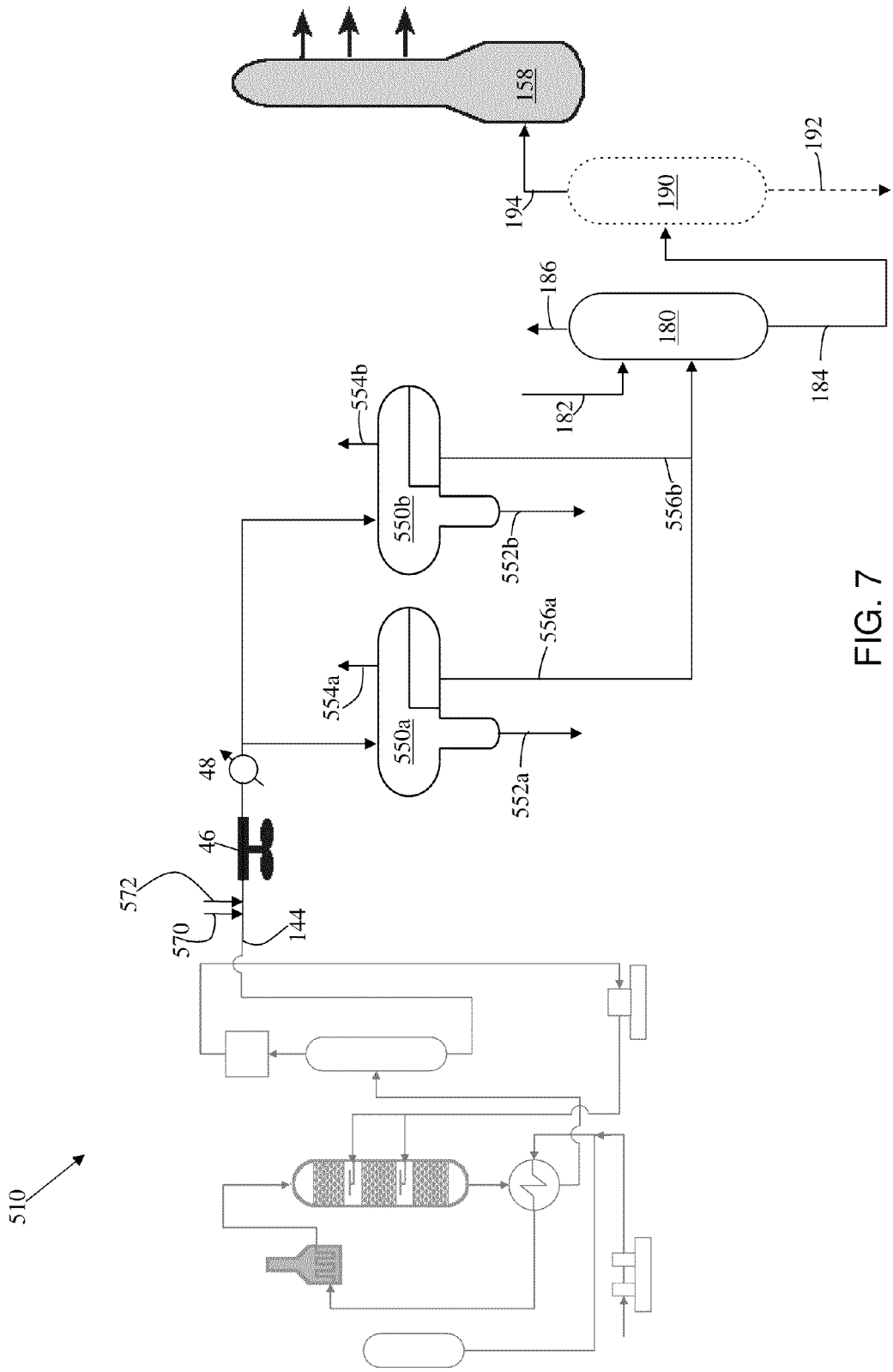
FIGS. 7 and 8 are process flow diagrams of a hydrotreating unit according to additional embodiments of the present invention integrating oxidative desulfurization in a low pressure separation zone including parallel separation vessels.
Figure 8:
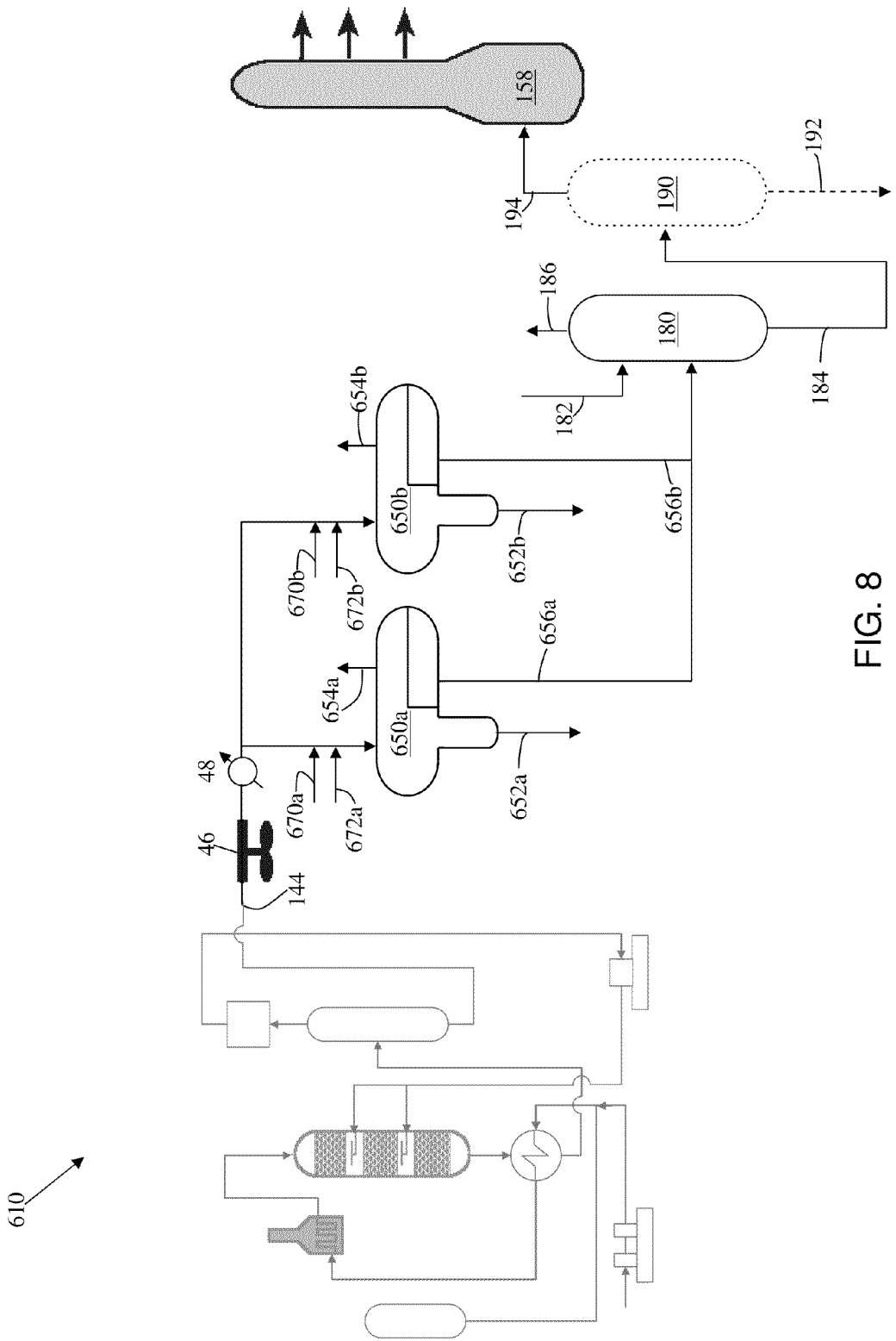

In certain embodiments, and referring generally to FIGS. 5 though 8, a plurality of low pressure separators are provided to: a) increase residence time thereby increasing contact time between the oxidant and the hydrocarbon to be desulfurized; b) increase total throughput capacity of the hydrotreating unit; and/or c) provide staged oxidative desulfurization operations. In particular, FIGS. 5 and 6 show embodiments of hydrotreating units integrating separators in a series-flow configuration, and FIGS. 7 and 8 show embodiments of hydrotreating units integrating separators in a parallel-flow configuration.

FIG. 5 shows an embodiment of a hydrotreating unit 310 of the present invention in which a plurality of low pressure low temperature separators are provided in a series-flow configuration, with the hydrocarbon effluent from the final low pressure low temperature separator 350b being introduced into the extraction unit 180. In particular, aqueous oxidant and catalyst are introduced at inlets 370, 372, respectively, and mixed with the high pressure separator effluent 144.

The mixed stream of hydrotreated hydrocarbons, oxidant and catalyst is introduced into the first low pressure low temperature separator 350a. Water, a portion of the reaction product sulfones and/or sulfoxides and ammonium sulfide salt can optionally be decanted via wastewater stream 352a (shown in dashed lines). Gases, e.g., $H_2S$, $NH_3$ and $C_1$-$C_4$, and any oxidant converted to gaseous oxygen, are purged via overhead stream 354a.

A hydrocarbon stream 356a containing untreated hydrocarbons, catalyst and oxidative desulfurization products sulfoxides and sulfones, is introduced to the second low pressure low temperature separator 350b for further separation. Any remaining gases $H_2S$, $NH_3$ and $C_1$-$C_4$, and oxidants that are converted to gaseous oxygen, are purged via overhead stream 354b, and remaining water and ammonium sulfide salt, unreacted oxidant, and any reaction product sulfones and/or sulfoxides that are dissolved in water, are decanted via wastewater stream 352b. In a preferred embodiment of the hydrotreating unit 310, all or a portion of the water phase (containing a minor portion of soluble sulfones and/or sulfoxides and unreacted oxidant) is not decanted, and is passed to the second low pressure low temperature separator 350b along with the hydrocarbon stream 356a.

A hydrocarbon stream 356b containing untreated hydrocarbons, catalyst and oxidative desulfurization products sulfoxides and sulfones, is introduced to the extraction unit 180 in which hydrocarbon product is recovered as described with respect to FIG. 3.

FIG. 6 shows a hydrotreating unit 410 according to another embodiment of the present invention where a series of low pressure low temperature separators are provided. In particular, aqueous oxidant and catalyst are introduced via inlets 470a and 472a and are mixed with the high pressure separator effluent 144. The mixed stream of hydrotreated hydrocarbons, oxidant and catalyst is introduced into the first low pressure low temperature separator 450a. Water, unreacted oxidant, any dissolved reaction products sulfones and/or sulfoxides and ammonium sulfide salt can optionally be decanted via wastewater stream 452a (shown in dashed lines). Gases are purged via overhead stream 454a. In a preferred embodiment of the hydrotreating unit 410, all or a portion of the water phase (containing a minor portion of soluble sulfones and/or sulfoxides and unreacted oxidant) is not decanted, and is passed to the second low pressure low temperature separator 450b along with the effluent hydrocarbon stream 456a.

The effluent 456a from the first low pressure low temperature separator 450a is mixed with further oxidant and catalyst introduced via inlets 470b and 472b, respectively, and the combined stream is passed to the second low pressure low temperature separator 450b. The additional oxidant and catalyst can be the same or different than the oxidant and catalyst introduced via lines 470a and 472a. For instance, in certain embodiments, it can be desirable to add a relatively small amount of oxidant and catalyst via inlets 470a, 472a, in which the oxidant is essentially reacted in its entirely and the catalyst is spent. Additional oxidant and catalyst is therefore introduced via inlets 470b, 472b to provide further oxidative desulfurization reactions in the second low pressure low temperature separator 450b. In other embodiments, a different type of oxidant can be introduced via line 470b, for instance, in which the oxidant introduced via line 470a targets a first category of organosulfur compounds and the oxidant introduced via line 470b targets a second category of organosulfur compounds. Additional benefits of multiple inlets for incorporation of oxidant and catalyst is to enhance mixing and residence time, and for enhanced separation of hydrocarbons and other by-products such as ammonia, sulfide salt, unreacted oxidant and spent and regenerable catalyst.

The mixture of the hydrocarbon stream 456a and the additional oxidant and catalyst is introduced to the second low pressure low temperature separator 450b for further separation. Any remaining gases $H_2S$, $NH_3$ and $C_1$-$C_4$ are purged via overhead stream 454b, along with oxidant that has been converted to gaseous oxygen. In addition, water, unreacted oxidant, ammonium sulfide salt and any dissolved oxidation reaction products sulfones and/or sulfoxides, are decanted via wastewater stream 452b. A hydrocarbon stream 456b containing untreated hydrocarbons, catalyst and oxidative desulfurization products sulfoxides and sulfones, is introduced to the extraction unit 180 in which hydrocarbon product is recovered as described with respect to FIG. 3.

FIG. 7 shows a hydrotreating unit 510 according to further embodiment of the present invention in which a plurality of low pressure low temperature separators are provided in parallel, with the hydrocarbon effluent from both low pressure low temperature separators being introduced into the extraction vessel. In particular, oxidant 570 and catalyst 572 are mixed with the high pressure separator effluent 144. The mixed stream of hydrotreated hydrocarbons, oxidant and catalyst is introduced, in parallel, into the first low pressure low temperature separator 550a and the second low pressure low temperature separator 550b. Water, unreacted oxidant, any dissolved reaction product sulfones and/or sulfoxides and ammonium sulfide salt are decanted via wastewater streams 552a, 552b. Gases are purged via overhead streams 554a, 554b.

Hydrocarbon streams 556a, 556b containing untreated hydrocarbons, catalyst and oxidative desulfurization products sulfoxides and sulfones, are combined and introduced to the extraction unit 180 in which hydrocarbon product is recovered as described with respect to FIG. 3.

FIG. 8 shows a hydrotreating unit 610 according to another embodiment of the present invention, which is similar to system 510 shown with respect to FIG. 7, with a modification that oxidant 670a, 670b and catalyst 672a, 672b are introduced in each of the parallel lines feeding low pressure low temperature separators 650a, 650b. While FIG. 8 shows system 610 in which effluents 656a, 656b are combined and in which the merged stream is passed to the extraction unit 180, it is contemplated that effluents 656a, 656b can be separately collected for use as hydrocarbon products of different sulfur speciation requirements. Accordingly, the process can be customized, for instance, to provide effluents 656a, 656b of different compositions. Using parallel low pressure low temperature separators 650a, 650b affords the ability to target different sulfur compounds at different stages; add more catalyst and/or oxidant between stages to supply to the system, add different catalyst and/or oxidant at different stages; provide additional mixing and residence time between oxidant, catalyst and sulfur compounds; and provide enhanced separation of hydrocarbons and other by-products ammonia sulfide salt, oxidant, and catalyst.

EXAMPLE

Figure 9:
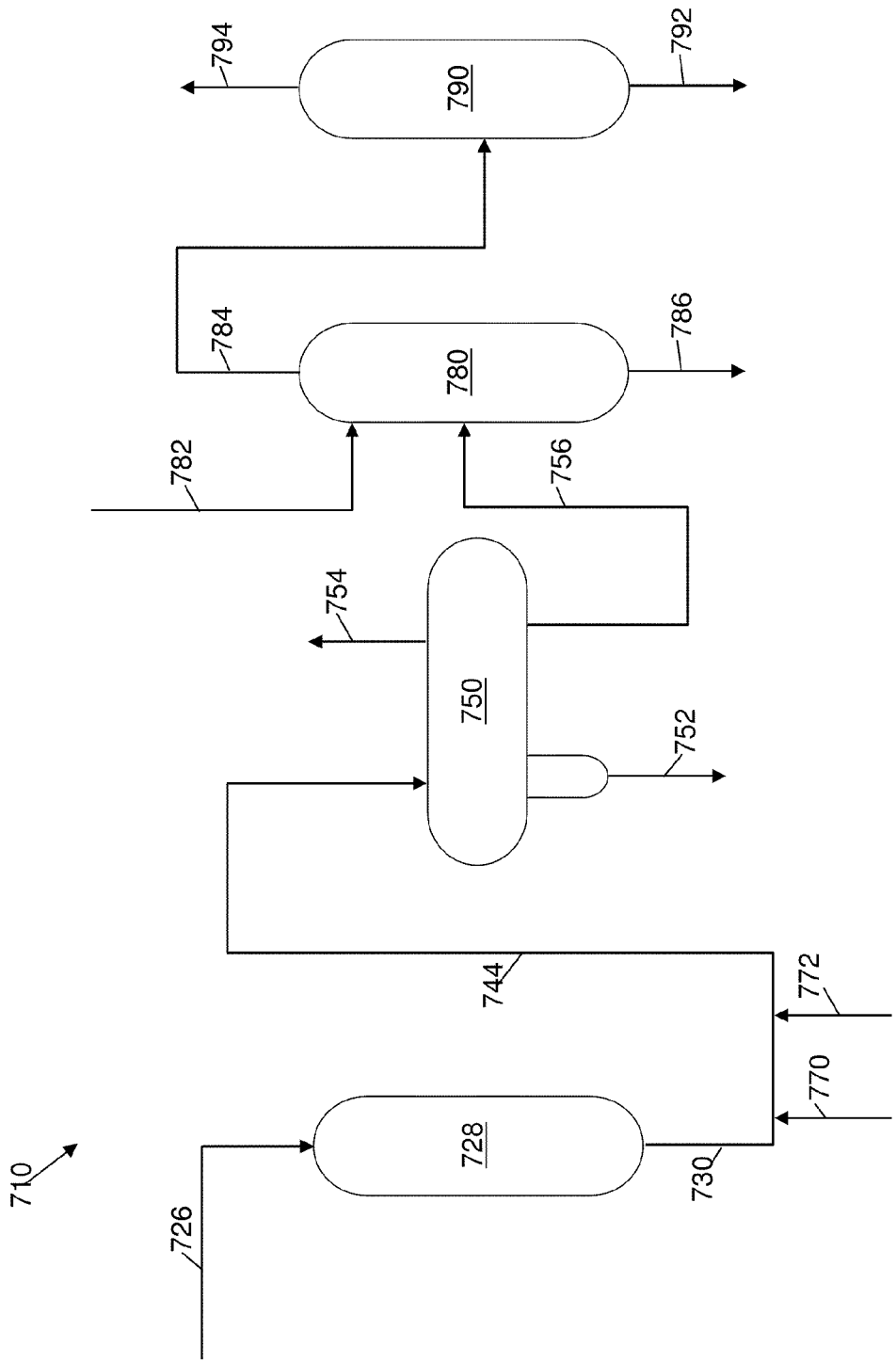
FIG. 9 is a process flow diagram of a hydrotreating unit integrating oxidative desulfurization in a low pressure separation zone used in an example according to the present invention.

FIG. 9 illustrates the process configuration for the example using the low pressure section of a hydrotreater to carry out the oxidation reactions. A diesel oil feed 726 containing 1.87 W % of sulfur (elemental sulfur excluding the carbon and hydrogen in the structure) and 87 ppmw of nitrogen was subjected to a hydrotreating process over Co—Mo on Alumina hydrotreating catalysts at 30 kg/cm$^2$ of hydrogen partial pressures, LHSV of 1 h−1 to obtain 500 ppmw of sulfur. From the sulfur speciation of the feedstock diesel, the average molecular weight of the sulfur species were calculated to be 202 g/g-mol. This results in 11.08 W % of organic sulfur, or 19,397 kg in 175,000 kg of diesel oil in diesel oil to be hydrotreated then and oxidized. Most of the organic sulfur compounds were hydrodesulfurized yielding H$_2$S and hydrocarbons. Only 0.05 W % elemental sulfur, or 0.28 W % of organic sulfur, remains in the hydrotreated products.

The desulfurized hydrocarbon stream 730 from the hydrotreating reactor 728 after cooling in a series of exchangers (not shown) was mixed with an aqueous oxidant 770 and a catalyst stream 772. The aqueous oxidant hydrogen peroxide was provided at a 4:1 oxidant to oil mole ratio, and 0.1 W % (based on the original feed) homogenous sodium tungstate catalyst was used.

The combined stream 744 was passed to a low pressure cold separator 750. The oxidant, catalyst and hydrocarbons remain in contact for a period of 15 minutes at 80° C., which allows the oxidation reactions of sulfur compounds in the hydrocarbon structure to occur in the pipeline and in the vessel, while the ammonium salt is dissolved in the excess aqueous phase. Waste water containing ammonium sulfide and some organic sulfur (2 kg per hour of total 519 kg per hour organic sulfur produced) was decanted as stream 752 from the vessel 750. The remaining light hydrocarbons were purged as stream 754 from vessel 750.

The hydrocarbon stream 756 containing catalyst and most of the sulfones (517 kg), as they are more soluble in hydrocarbons than water, was passed to the extraction vessel 780 along with a methanol stream 782 to separate the reaction by products sulfoxides and sulfones from the hydrocarbon mixture. The methanol amount used was about equal parts of the treated hydrocarbons to dissolve the oxidation by-products sulfones. About 1 W % of sulfones of total sulfones produced in the oxidation reactions remained in the hydrocarbons during the extractions and discarded from the process.

The hydrocarbons containing reduced sulfur-content, stream 784, was passed to the adsorption column 790 for polishing, and an essentially sulfur-free diesel product (<10 ppmw) stream 794 was obtained from the adsorption column and the process reject stream 792 containing all the sulfones are obtained from the adsorption column 790. The material balance for the integrated hydrotreating-oxidative process is given in Table 3.

TABLE 3

| | Stream # | | | | | | |
|---|---|---|---|---|---|---|---|
| | 726 | 730 | 770 | 772 | 744 | 752 | 754 |
| Component | Feedstock Kg/h | Rcr Outlet Kg/h | Aqueous Oxidant Kg/h | Catalyst Kg/h | Combined Stream Kg/h | Waste Water Kg/h | Cold Sep Vapor Kg/h |
| Ammonia | 0 | 18 | 0 | 0 | 18 | 18 | 0 |
| Hydrogen sulfide | 0 | 3,476 | 0 | 0 | 3,476 | 35 | 2,373 |
| Water | 0 | 0 | 8,750 | 0 | 8,750 | 8,953 | 0 |
| Hydrogen | 0 | 3,382 | 0 | 0 | 3,382 | 0 | 3,353 |
| Methanol | 0 | 0 | 0 | 0 | 0 | 0 | 0 |
| Methane | 0 | 2,197 | 0 | 0 | 2,197 | 0 | 2,075 |
| Ethane | 0 | 469 | 0 | 0 | 469 | 0 | 378 |
| Propane | 0 | 317 | 0 | 0 | 317 | 0 | 181 |
| Butanes | 0 | 230 | 0 | 0 | 230 | 0 | 94 |
| Diesel | 155,603 | 171,915 | 0 | 0 | 171,915 | 0 | 24 |
| Organic Sulfur | 19,397 | 519 | 0 | 0 | 519 | 2 | 0 |
| Acetic Acid | 0 | 0 | 0 | 10,799 | 10,799 | 10,799 | 0 |
| Na$_2$WO$_4$ | 0 | 0 | 0 | 175 | 175 | 173 | 0 |
| Hydrogen Peroxide | 0 | 0 | 383 | 0 | 383 | 0 | 0 |
| Total Kgh | 175,000 | 182,523 | 9,133 | 10,974 | 202,631 | 19,980 | 8,478 |

| | Stream # | | | | | |
|---|---|---|---|---|---|---|
| | 756 | 782 | 784 | 786 | 794 | 792 |
| Component | Cold Sep Liquid Kg/h | Methanol in Kg/h | Extracted Oil Kg/h | Methanol out Kg/h | Cleaned Oil Kg/h | Residue Kg/h |
| Ammonia | 0 | 0 | 0 | 0 | 0 | 0 |
| Hydrogen sulfide | 1,068 | 0 | 1,068 | 0 | 1,068 | 0 |
| Water | 0 | 0 | 0 | 0 | 0 | 0 |
| Hydrogen | 29 | 0 | 29 | 0 | 29 | 0 |
| Methanol | 0 | 174,173 | 135 | 174,038 | 135 | 0 |
| Methane | 121 | 0 | 121 | 0 | 121 | 0 |
| Ethane | 91 | 0 | 91 | 0 | 91 | 0 |
| Propane | 136 | 0 | 136 | 0 | 136 | 0 |
| Butanes | 136 | 0 | 136 | 0 | 136 | 0 |
| Diesel | 172,071 | 0 | 172,071 | 0 | 172,069 | 0 |

TABLE 3-continued

| | | | | | | |
|---|---|---|---|---|---|---|
| Organic Sulfur | 517 | 0 | 3 | 514 | 2 | 3 |
| Acetic Acid | 0 | 0 | 0 | 0 | 0 | 0 |
| $Na_2WO_4$ | 2 | 0 | 5 | 2 | 0 | 5 |
| Hydrogen Peroxide | 0 | 0 | 0 | 0 | 0 | 0 |
| Total Kgh | 174,173 | 174,173 | 173,796 | 174,552 | 173,788 | 8 |

The methods and systems of the present invention have been described above and in the attached drawings; however, modifications will be apparent to those of ordinary skill in the art and the scope of protection for the invention is to be defined by the claims that follow.

What is claimed is:

1. A process for desulfurizing a hydrocarbon feed stream containing organosulfur compounds comprising:
   a. subjecting the hydrocarbon feed stream to a hydrotreating reaction, wherein the hydrocarbon feed stream is contacted with hydrogen to convert a portion of the organosulfur compounds into a hydrotreated effluent containing hydrogen sulfide and a mixture of hydrocarbons, the mixture of hydrocarbons having a reduced organosulfur compound content as compared to the hydrocarbon feed stream;
   b. passing the hydrotreated reaction effluent to a high pressure separator to remove gaseous components and produce a high pressure separator hydrocarbon effluent stream,
   c. mixing the high pressure separator hydrocarbon effluent stream with an oxidant and an oxidation catalyst resulting in a combined stream;
   d. introducing the combined stream into a low pressure separator, wherein a portion of the remaining organosulfur compounds from the hydrotreated reaction effluent are oxidized;
   e. separating the combined stream in the low pressure separator into
      a gas overhead stream containing a portion of the hydrogen sulfide, ammonia gas and any light hydrocarbons,
      a water stream containing excess water, ammonium sulfide salt, any unreacted oxidant and any oxidation reaction products dissolved in water, and
      a liquid hydrocarbon stream containing hydrocarbons and oxidation reaction products including sulfoxides and/or sulfones;
   f. separating the liquid stream in an extraction unit into an oxidation reaction product stream and hydrocarbon product stream having a reduced organosulfur compound content as compared to the hydrotreated reaction effluent.

2. The process as in claim 1, wherein step (e) occurs in a series of low pressure separators.

3. The process as in claim 2, wherein at least a portion of water separated in step (e) is retained in the liquid hydrocarbon stream from a first of a series of low pressure separators and passed to a second of the series of low pressure separators, the water stream containing unreacted oxidant.

4. The process as in claim 2, further comprising introducing additional oxidant between a first of a series of low pressure separators and a second of the series of low pressure separators.

5. The process as in claim 2, further comprising introducing additional catalyst between a first of a series of low pressure separators and a second of the series of low pressure separators.

6. The process as in claim 1, wherein step (e) occurs in a parallel arrangement of a plurality of low pressure separators.

7. The process as in claim 6, further comprising introducing additional oxidant between a first of the parallel arrangement of low pressure separators and a second of the parallel arrangement of low pressure separators.

8. The process as in claim 6, further comprising introducing additional catalyst between a first of the parallel arrangement of low pressure separators and a second of the parallel arrangement of low pressure separators.

* * * * *